No. 795,191. PATENTED JULY 18, 1905.
J. W. BONSALL.
LAWN MOWER ATTACHMENT.
APPLICATION FILED AUG. 11, 1904.
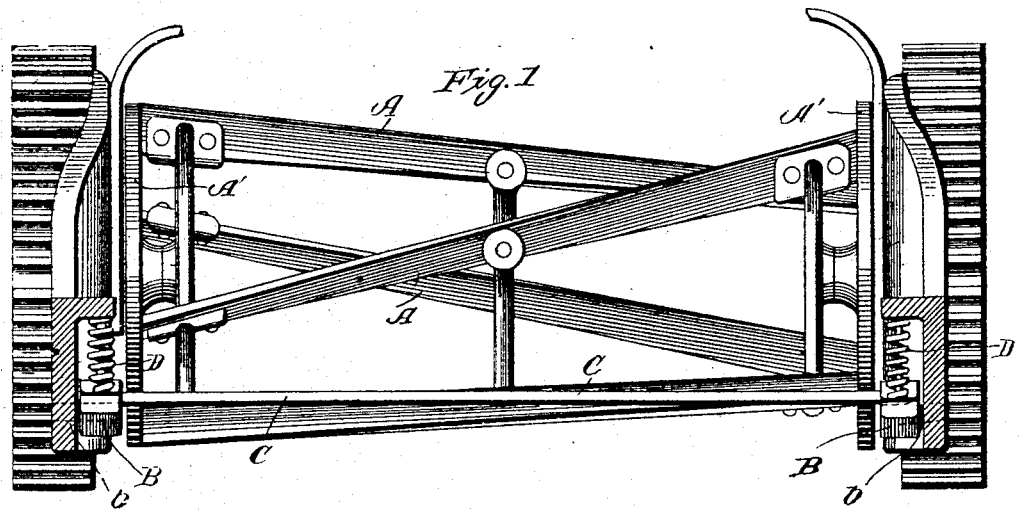
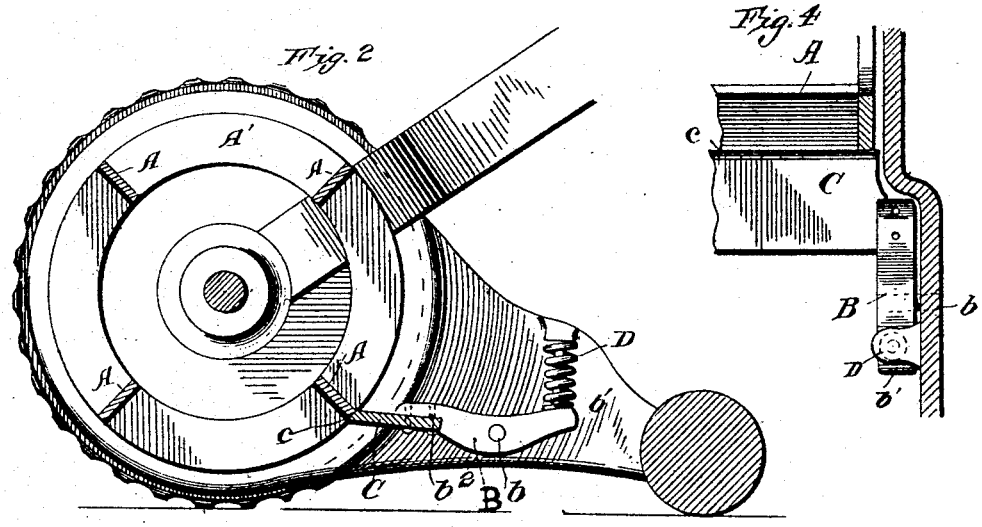
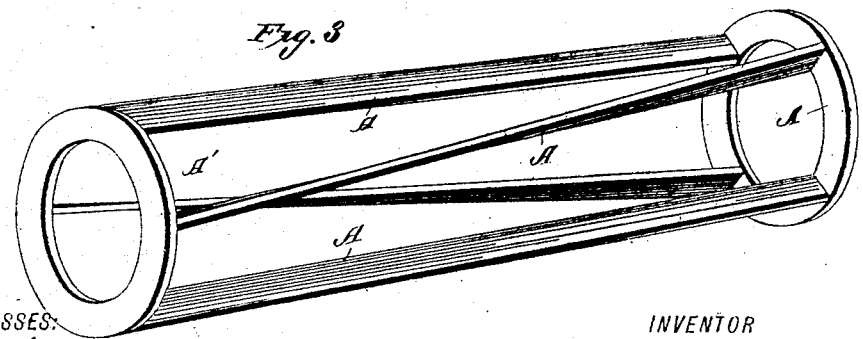
WITNESSES:
INVENTOR
James W. Bonsall
BY
ATTORNEYS No. 795,191.

Patented July 18, 1905.

UNITED STATES PATENT OFFICE.

JAMES WRIGHT BONSALL, OF GLENVILLE, OHIO.

LAWN-MOWER ATTACHMENT.

SPECIFICATION forming part of Letters Patent No. 795,191, dated July 18, 1905.

Application filed August 11, 1904. Serial No. 220,350.

*To all whom it may concern:*

Be it known that I, JAMES WRIGHT BONSALL, a citizen of the United States, residing at Glenville, in the county of Cuyahoga and State of Ohio, have invented a new and useful Improvement in Lawn-Mower Attachments, of which the following is a specification.

My invention relates to an improvement in lawn-mowers, its object being to reduce the number of parts and to prevent any grass being carried around by the rotating knives and to insure the cutting of all grass within the path of the mower.

With these objects in view my invention consists in certain novel features of construction, arrangement and combination of parts, as will be hereinafter fully described, and pointed out in the claims.

Figure 1 is a rear elevation, partly in section, of a lawn-mower embodying my improvement. Fig. 2 is a vertical section. Fig. 3 is a perspective view of the rotary knife-cylinder. Fig. 4 is a detail sectional plan view of one side of the mower.

In carrying out my invention, which is to be applied to lawn-mowers of the rotating-cylinder type having the knives spirally secured to a frame or cylinder, which is secured to the axle of the mower, said knives A will be secured at their ends to the knife-guides A' A' by welding or other suitable means. Said guides or end pieces are to be flat rings of the same width as that of the blades and of about the same thickness. To the rear of rotating knives and below the plane of the axle is secured pivotally to the frame of the mower the castings B, having the pivots $b$ and the rearwardly-projecting ears $b'$. To the front ends of said castings is riveted or bolted a flat blade C, having its front edge $c$ beveled and sharpened. Said blade or knife is secured to the under side of the casting B in a cut-out seat $b^2$. A spring D rests or bears against the upper rear end of each of the castings B, the upper end of said spring bearing against the frame of the mower. The office of this spring is to always keep the front edge of the knife C, which is substantially stationary as distinguished from the rotating blades, against the circumference of the guides A' A' and just touching the revolving knives. The bevel of the front edge of the knife C will substantially coincide with the circumference of the guides A' A', so that the revolving blades will just touch the stationary knife, whereby in using the lawn-mower no grass can go through between the revolving blades and the stationary blade, thus insuring a perfect cutting of the grass of the lawn. The spring D will always hold the stationary knife up to the guides A' A', and as the circumference of the guides is just even or flush with the cutting-surface no grass, as said before, can be carried up by the revolving blades without being first cut.

It will be observed that my improvement is extremely simple and cheap, can be easily applied and detached, and will add greatly to the efficiency of the mower. The adjusting-screws commonly used on mowers of this type are done away with, and should any of the parts, such as the blades or the spring, break they can be readily replaced. The guides A' A' may also be removed and replaced when necessary or desired.

Having thus described my invention, what I claim as new, and desire to secure by Letters Patent, is—

1. In a lawn-mower the combination with a rotary cutter consisting of end guide-rings and integral spiral blades connecting the same, the circumference of said guide-rings coinciding and being flush with the outer edges of said spiral blades, of an oscillatory knife mounted in the frame of the mower, said oscillatory knife having its front edge beveled and coinciding with the circumference of the end guide-rings, said end guide-rings forming stops for the beveled edge of the oscillatory knife.

2. In a lawn-mower the combination with the revolving cutter consisting of end guide-rings and integral spiral blades connecting the same, the circumference of said rings and the outer edge of the blades coinciding and being flush with each other, of oscillatory bars and a knife secured at its ends to said oscillatory bars, and having its front edge beveled, said beveled edge coinciding with the circumference of the end guide-rings, rearwardly-extending ears or lugs at each end of the oscillatory knife-bar, lugs projecting inwardly from the frame of the mower above the rearwardly-extending ears or lugs at the ends of the oscillatory knife-bar, and springs between the frame-lugs and the ears of the oscillatory knife, said end guide-rings forming stops for the oscillatory knife-bars.

JAMES WRIGHT BONSALL.

Witnesses:
  JOSEPH D'ERRICO,
  W. H. PARKER.